United States Patent
Zhang et al.

(10) Patent No.: US 10,945,019 B2
(45) Date of Patent: Mar. 9, 2021

(54) VIDEO UPLOADING METHOD, CAMERA APPARATUS AND STORAGE MEDIUM

(71) Applicant: Beijing Xiaomi Mobile Software Co., Ltd., Beijing (CN)

(72) Inventors: Yanlu Zhang, Beijing (CN); Sitai Gao, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 165 days.

(21) Appl. No.: 16/126,273

(22) Filed: Sep. 10, 2018

(65) Prior Publication Data
US 2019/0020914 A1 Jan. 17, 2019

Related U.S. Application Data

(63) Continuation of application No. PCT/CN2016/085411, filed on Jun. 12, 2016.

(51) Int. Cl.
*G06F 15/16* (2006.01)
*H04N 21/4223* (2011.01)
(Continued)

(52) U.S. Cl.
CPC ..... *H04N 21/4223* (2013.01); *H04L 65/1073* (2013.01); *H04L 65/4076* (2013.01);
(Continued)

(58) Field of Classification Search
CPC ............ H04N 21/2187; H04N 21/2743; H04L 65/4076
(Continued)

(56) References Cited

U.S. PATENT DOCUMENTS

2006/0284982 A1* 12/2006 Bigioi ............... H04N 1/00145
348/207.1
2014/0036100 A1* 2/2014 Kostadinovich ......... H04N 5/76
348/207.1
(Continued)

FOREIGN PATENT DOCUMENTS

CN 103533443 A 1/2014
CN 104639549 A * 5/2015 ......... H04L 65/1073
(Continued)

OTHER PUBLICATIONS

International Search Report issued for International Application No. PCT/CN2016/085411, mailed from the State Intellectual Property Office of China dated Feb. 9, 2017.
(Continued)

*Primary Examiner* — Hannah S Wang
(74) *Attorney, Agent, or Firm* — Finnegan, Henderson, Farabow, Garrett & Dunner, L.L.P, (57) ABSTRACT

A video uploading method, includes: sending a live cast request message to a first server when it is determined that a preset key is triggered, the live cast request message carrying a device identification of a camera apparatus; receiving a live cast address generated by the first server according to the live cast request message, the live cast address corresponding to the device identification; and uploading a video stream recorded by the camera apparatus to a second server, a storage space of the video stream in the second server being determined by the live cast address.

6 Claims, 7 Drawing Sheets

(51) Int. Cl.
*H04N 21/2187* (2011.01)
*H04N 21/2743* (2011.01)
*H04L 29/06* (2006.01)
*H04L 29/08* (2006.01)
*H04L 29/14* (2006.01)
*H04N 21/414* (2011.01)

(52) U.S. Cl.
CPC .............. *H04L 67/04* (2013.01); *H04L 67/22* (2013.01); *H04N 21/2187* (2013.01); *H04N 21/2743* (2013.01); *H04L 69/40* (2013.01); *H04N 21/41407* (2013.01)

(58) Field of Classification Search
USPC ........................................................ 709/219
See application file for complete search history.

(56) References Cited

U.S. PATENT DOCUMENTS

| | | | | |
|---|---|---|---|---|
| 2014/0062835 A1* | 3/2014 | Nosaka | ................ | G06F 3/1423 345/1.2 |
| 2014/0108618 A1 | 4/2014 | Lee et al. | | |
| 2015/0052235 A1* | 2/2015 | Tokunaga | ............... | H04L 67/16 709/223 |
| 2015/0138231 A1* | 5/2015 | Wang | ...................... | H04L 67/38 345/633 |
| 2015/0365512 A1* | 12/2015 | MacKenzie | ........... | H04W 12/08 455/420 |
| 2016/0029047 A1* | 1/2016 | Spidella | ............. | H04N 21/2187 725/93 |
| 2016/0150588 A1* | 5/2016 | Yae | ........................ | H04L 67/12 455/41.2 |
| 2016/0182850 A1* | 6/2016 | Thompson | ........... | H04N 9/8205 348/158 |
| 2018/0020495 A1* | 1/2018 | Nakayama | ........... | H04W 12/08 |

FOREIGN PATENT DOCUMENTS

| | | | |
|---|---|---|---|
| CN | 105025314 A | 11/2015 | |
| CN | 105208110 A | 12/2015 | |
| CN | 105306959 A | 2/2016 | |
| WO | WO 2009/138721 A2 | 11/2009 | |
| WO | WO-2012166444 A2 * | 12/2012 | ......... H04N 21/6125 |

OTHER PUBLICATIONS

Extended European Search Report issued for European Patent Application No. 17174384.2, from the European Patent office, dated Oct. 19, 2017.

* cited by examiner

VIDEO UPLOADING METHOD, CAMERA APPARATUS AND STORAGE MEDIUM

CROSS-REFERENCE TO RELATED APPLICATIONS

This application is based on and claims priority to International Application No. PCT/CN2016/085411, filed on Jun. 12, 2016, which is incorporated herein by reference in its entirety.

TECHNICAL FIELD

The present disclosure generally relates to the technical field of live video cast, and more particularly, to a video uploading method, a camera apparatus, and a storage medium.

BACKGROUND

In related art, when a user needs to perform live video cast via a camera, the user controls the camera to record a video by using an application in a smart phone, and controls the camera to upload the recorded video to a server by using the smart phone. By controlling the camera using the smart phone, the user needs to operate the application during video recording, which distracts attention of the user during a live video cast and adversely affects the user's interaction with an audience during the live video cast.

SUMMARY

According to a first aspect of the present disclosure, there is provided a video uploading method, comprising: sending a live cast request message to a first server when it is determined that a preset key is triggered, the live cast request message carrying a device identification of a camera apparatus; receiving a live cast address generated by the first server according to the live cast request message, the live cast address corresponding to the device identification; and uploading a video stream recorded by the camera apparatus to a second server, a storage space of the video stream in the second server being determined by the live cast address.

According to a second aspect of the present disclosure, there is provided a camera apparatus, comprising: a processor; a memory for storing instructions executable by the processor, wherein the processor is configured to: send a live cast request message to a first server when it is determined that a preset key is triggered, the live cast request message carrying a device identification of the camera apparatus; receive a live cast address generated by the first server according to the live cast request message, the live cast address corresponding to the device identification; and upload a video stream recorded by the camera apparatus to a second server, a storage space of the video stream in the second server being determined by the live cast address.

According to a third aspect of the present disclosure, there is provided a non-transitory computer-readable storage medium having stored therein instructions that, when executed by a processor of a camera apparatus, cause the camera apparatus to perform a video uploading method, the method comprising: sending a live cast request message to a first server when it is determined that a preset key is triggered, the live cast request message carrying a device identification of the camera apparatus; receiving a live cast address generated by the first server according to the live cast request message, the live cast address corresponding to the device identification; and uploading a video stream recorded by the camera apparatus to a second server, a storage space of the video stream in the second server being determined by the live cast address.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated into and constitute a part of the description, illustrate embodiments according to the present disclosure, and serve to explain the principles of the present disclosure together with the description.

DETAILED DESCRIPTION

Reference will now be made in detail to exemplary embodiments, examples of which are illustrated in the accompanying drawings. The following description refers to the accompanying drawings in which the same numbers in different figures represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

Figure 1A:
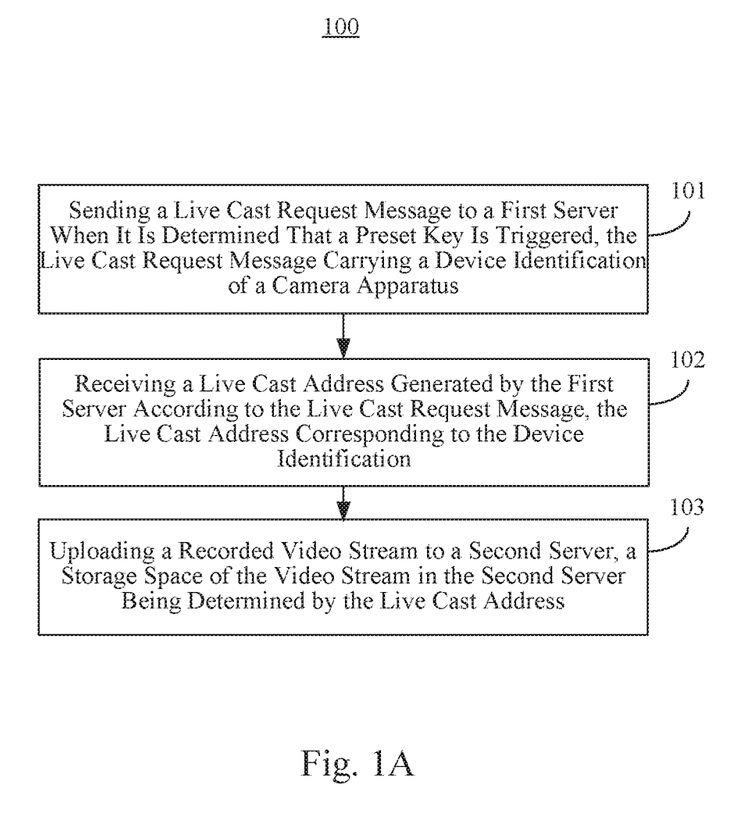
FIG. 1A is a flowchart of a video uploading method according to an exemplary embodiment.
Figure 1B:
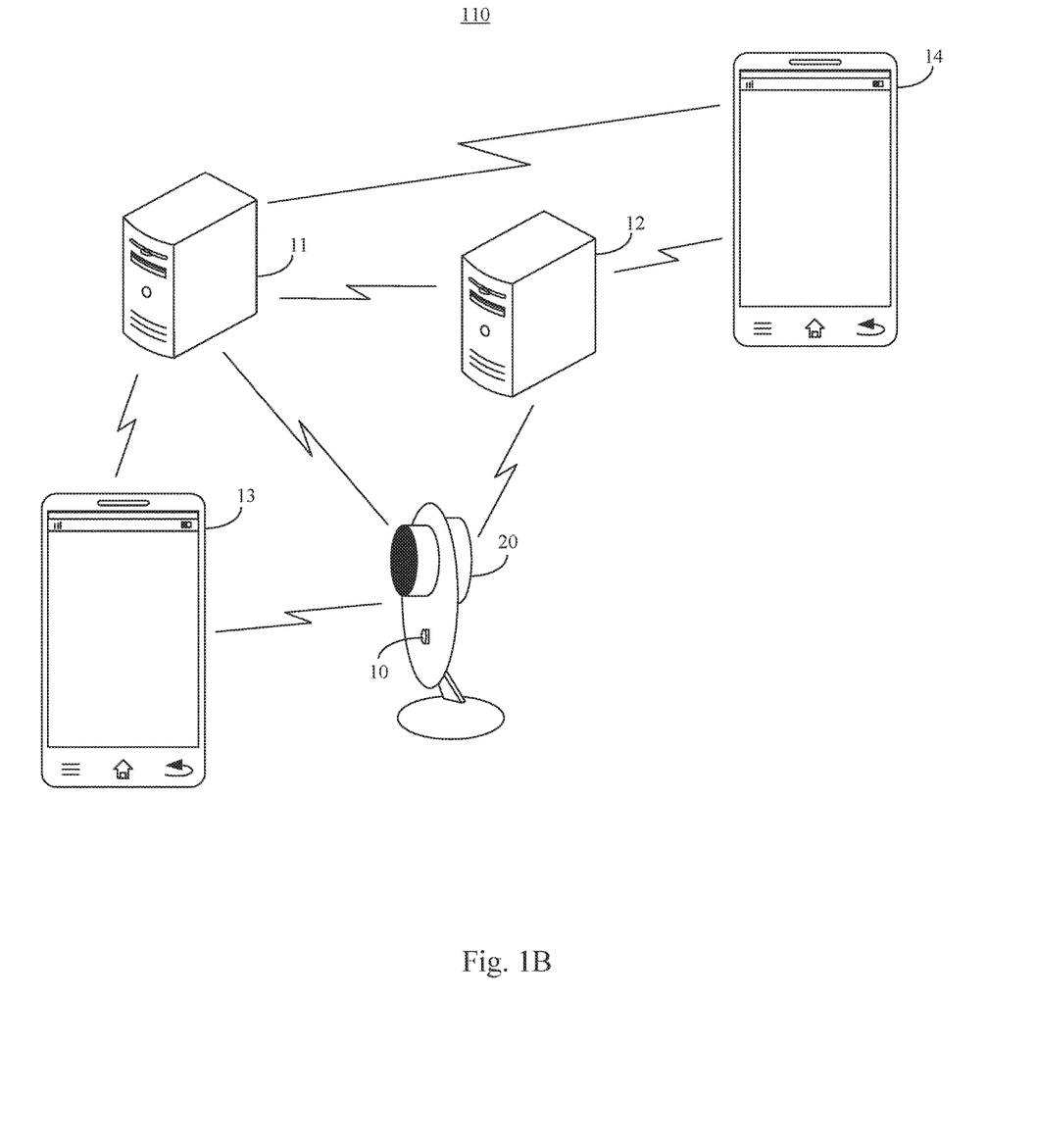
FIG. 1B is a schematic diagram of a system for implementing a video uploading method according to an exemplary embodiment.

FIG. 1A is a flowchart of a video uploading method 100 according to an exemplary embodiment. FIG. 1B is a schematic diagram of a system 110 for implementing the video uploading method 100 (FIG. 1A) according to an exemplary embodiment. The video uploading method 100 can be applied to an electronic device, such as a smart phone, a tablet computer, a camera apparatus, etc., provided with a preset key. As shown in FIG. 1A, the video uploading method 100 includes the following steps 101-103.

In step 101, a live cast request message is sent to a first server when it is determined that a preset key is triggered, the live cast request message carrying a device identification of a camera apparatus.

In an embodiment, shown in FIG. 1B, a preset key 10 is provided on a camera apparatus 20, and the preset key 10 can be monitored by a microprocessor (not shown) in the camera apparatus 20 to detect whether the preset key 10 is triggered. It will be appreciated by those skilled in the art that the present disclosure does not limit a location of the preset key 10 on the camera apparatus 20, which may be anywhere as long as the location can facilitate a user who is recording a video, e.g., for him or her self (hereafter "the recording user") to trigger the camera apparatus 20. In an embodiment, the camera apparatus 20 may be provided with a wireless communication interface, such as a WiFi interface. When the preset key 10 is triggered, the microprocessor in the camera apparatus 20 sends a live cast request message to a first server 11, the request message including a device identification ("ID") of the camera apparatus 20. In an embodiment, the device ID of the camera apparatus 20 may be a media access control (MAC) address of the camera apparatus 20.

In step 102, a live cast address generated by the first server according to the live cast request message is received, the live cast address corresponding to the device ID.

In an embodiment, the live cast address may be a uniform resource locator (URL) address. The first server 11 may record a correspondence between the device ID of the camera apparatus 20 and the URL address in a list and send the URL address to a second server 12. In an embodiment, the first server 11 may manage a user account and a live cast room of the recording user represented by the live cast address used during a live video cast, and record a correspondence between the user account and the live cast room. The first server 11 may also push a latest video live cast to an audience user who watches the video.

In step 103, a recorded video stream is uploaded to a second server, a storage space of the video stream in the second server being determined by the live cast address.

In an embodiment, the second server 12 may be located in a server cluster which may include a plurality of streaming media servers that provide video storage service for live video cast. In an embodiment, when uploading a video stream to the server cluster via a wireless communication interface, the camera apparatus 20 sends the live cast address to the server cluster with the live cast address carried in the video stream. As such, the server cluster can, according to the live cast address, determine that the second server 12 stores the video stream in a storage space corresponding to the live cast address.

In an embodiment, the recording user controls the camera apparatus 20 to access a communication network, such as a WiFi network, via an electronic device 13. When the recording user needs to record the video, video recording can be started by triggering the preset key 10, and the camera apparatus 20 can upload the recorded video stream to the second server 12 through steps 101-103 (FIG. 1A). As such, the recording user does not need to manually operate the electronic device 13 during the video recording, and can focus on the live video cast, which improves the recording user's interaction with an audience during the live video cast. For the audience, an electronic device 14 of an audience user has a live cast application installed therein. The first server 11 may push the live cast address of the recorded video stream and an icon set by the recording user to the live cast application in the electronic device 14, and the audience user can play the video stream recorded by the camera apparatus 20 by triggering the live cast address corresponding to the icon.

In the method 100, a live cast can be initiated in a one-key trigger manner, thereby eliminating the need for the recording user to control a camera to record a video by operating a video live cast application installed in a smart phone, and simplifying operations of the recording user during video recording. Since a live cast address is generated by the first server according to the live cast request message, live cast addresses corresponding to videos recorded by the camera apparatus at different times are also different. As such, videos recorded by the camera apparatus can be prevented from being attacked by a malicious user on the second server, and the security of storing the videos recorded by the camera apparatus on the second server is improved.

In an embodiment, the video uploading method 100 may further include: determining whether the preset key is triggered during the uploading of the video stream; and stopping uploading the video stream to the second server if the preset key is triggered.

In an embodiment, the video uploading method 100 may further include: determining a current video stream recording state of the camera apparatus; and informing an electronic device bound with the camera apparatus of the recording state for synchronization.

In an embodiment, the video uploading method 100 may further include: receiving a binding prompt message from the first server and determining a time point when the binding prompt message is received, before the electronic device is bound with the camera apparatus; monitoring whether the preset key is triggered within a preset time period starting from the time point; and sending a binding confirmation message to the first server when the preset key is triggered within the preset time period.

In an embodiment, the video uploading method 100 may further include: sending a binding failure prompt message to the first server at an ending time point of the preset time period, when the preset key is not triggered within the preset time period.

Figure 2:
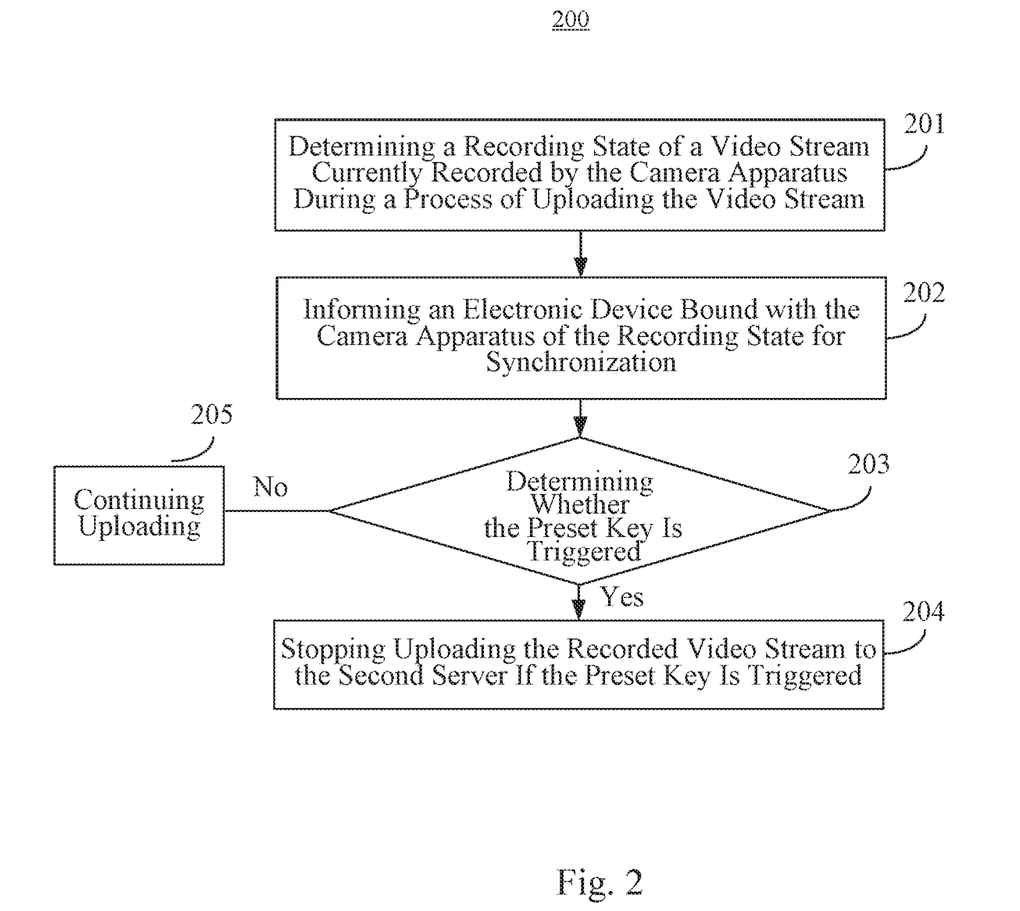
FIG. 2 is a flowchart of a video uploading method according to an exemplary embodiment.

FIG. 2 is a flowchart of a video loading method 200 according to an exemplary embodiment. This embodiment is described in conjunction with FIG. 1B, to illustrate handling a recording state of a camera apparatus and control of the camera apparatus to stop recording a video with one key. As shown in FIG. 2, the method 200 includes the following steps.

In step 201, a recording state of a video stream currently recorded by the camera apparatus is determined during a process of uploading the video stream.

In an embodiment, the recording state may include: a time point of starting the recording, a duration of the recording till a current time, the starting or ending of the recording and so on. In an embodiment, the recording state of the camera apparatus 20 may be monitored by the microprocessor of the camera apparatus 20.

In step 202, an electronic device bound with the camera apparatus is informed of the recording state for synchronization.

In an embodiment, the camera apparatus 20 may synchronize the recording state with the electronic device 13 by way of wireless communications or through a USB cable.

In step 203, it is determined whether a preset key is triggered. If the preset key is triggered, step 204 is performed. If the preset key is not triggered, the uploading of the recorded video stream continues (step 205).

In an embodiment, to improve accuracy of one-key triggering, the microprocessor of the camera apparatus 20 can make the preset key 10 correspond to operating states of the camera apparatus 20. For example, in case the camera apparatus 20 has not activated a video recording function yet, the camera apparatus 20 activates the video recording function if the preset key 10 is triggered. During the video recording by the camera apparatus 20, the camera apparatus 20 can disable the video recording function automatically if the preset key is triggered. When the camera apparatus 20 detects that it has not bound with the electronic device 13 yet, the camera apparatus 20 can initiate a binding process with the electronic device 13 if the preset key 10 is triggered.

Details about how to realize the binding in a one-key trigger manner are described below with regard to the embodiment illustrated in FIG. 3.

In step 204, the uploading of the recorded video stream to a second server is stopped if the preset key is triggered.

It will be appreciated by those skilled in the art that, in this embodiment, the order of the process of synchronizing the recording state and the process of terminating a live video cast by monitoring whether the preset key is triggered is not limited by steps 201 to 204. Steps 203 and 204 may also be performed before steps 201 and 202, or steps 201 and 202 may be performed in parallel with steps 203 and 204.

In this embodiment, by informing the electronic device of the recording state by the camera apparatus, the electronic device can accurately present the start and end time points of the video recording by the camera apparatus and the duration of the video recording to the recording user, thereby reducing a time error caused by delay in communications with the camera apparatus and improving accuracy for the recording user to control the video recording progress according to the recording state.

Figure 3:
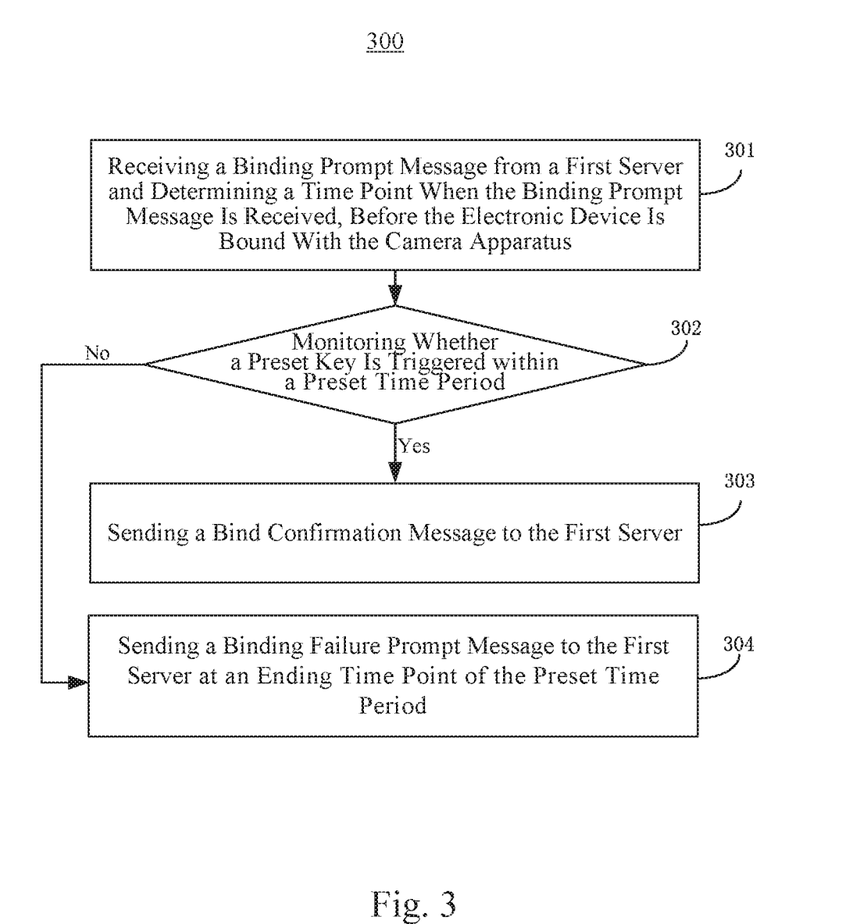
FIG. 3 is a flowchart of a video uploading method according to an exemplary embodiment.

FIG. 3 is a flowchart of a video uploading method 300 according to an exemplary embodiment. This embodiment is described in conjunction with FIG. 1B to illustrate binding a camera apparatus with an electronic device in a one-key trigger manner. As shown in FIG. 3, the method 300 includes the following steps.

In step 301, a binding prompt message is received from a first server and a time point is determined when the binding prompt message is received, before the electronic device is bound with the camera apparatus.

In an embodiment, the first server 11 may forward a binding prompt message to the camera apparatus 20 according to the binding request message sent by the electronic device 13. For example, when the recording user needs to bind the electronic device 13 with the camera apparatus 20, the electronic device 13 identifies devices which are not bound with it currently (for example, a plurality of smart devices such as a smart air conditioner, the camera apparatus 20 and so on) through scanning, and displays those devices on a user interface. When the recording user selects the camera apparatus 20, the electronic device 13 generates a binding request message which carries the device ID of the camera apparatus 20. After receiving this binding request message, the first server 11 sends a binding prompt message to the camera apparatus 20. After receiving this binding prompt message, the camera apparatus 20 determines the time point when the binding prompt message is received, such as 10:20:00.

In step 302, it is monitored whether a preset key is triggered within a preset time period starting from the time point. If the preset key is triggered within the preset time period, step 303 is performed. If the preset key is not triggered within the preset time period, step 304 is performed.

In an embodiment, the preset time period can be set by the first server 11. Durations needed for a large number of users to normally bind an electronic device with a camera apparatus can be statistically processed to determine the preset time period. The preset time period is sent to the camera apparatus 20, so that the camera apparatus 20 can monitor the trigger action of the recording user within this preset time period. The preset time period can be 30 seconds, for example.

In step 303, a binding confirmation message is sent to the first server when the preset key is triggered within the preset time period.

For example, supposing that the recording user triggers the preset key 10 at 10:20:00, the camera apparatus 20 can send a binding confirmation message to the first server 11 after monitoring that the preset key 10 is triggered. After receiving this binding confirmation message, the first server 11 notifies the electronic device 13 that the binding is successful.

In step 304, a binding failure prompt message is sent to the first server at an ending time point of the preset time period, when the preset key is not triggered within the preset time period.

For example, supposing that the recording user does not trigger the preset key 10 before 10:20:30, the camera apparatus 20 can send a binding failure prompt message to the first server 11 at 10:20:30. After receiving this binding failure prompt message, the first server 11 notifies the electronic device 13 that the binding has failed, so that the recording user can be prompted in time to re-bind the electronic device 13 with the camera apparatus 20.

In this embodiment, the camera apparatus and the electronic device are bound in a one-key trigger manner, which simplifies operations of the recording user to bind the camera apparatus. By sending a binding confirmation message or a binding failure prompt message to the first server, the first server can provide feedback to the electronic device in time according to the received message, such that the recording user can learn the binding result in time or re-bind the electronic device and the camera apparatus in time.

Figure 4:
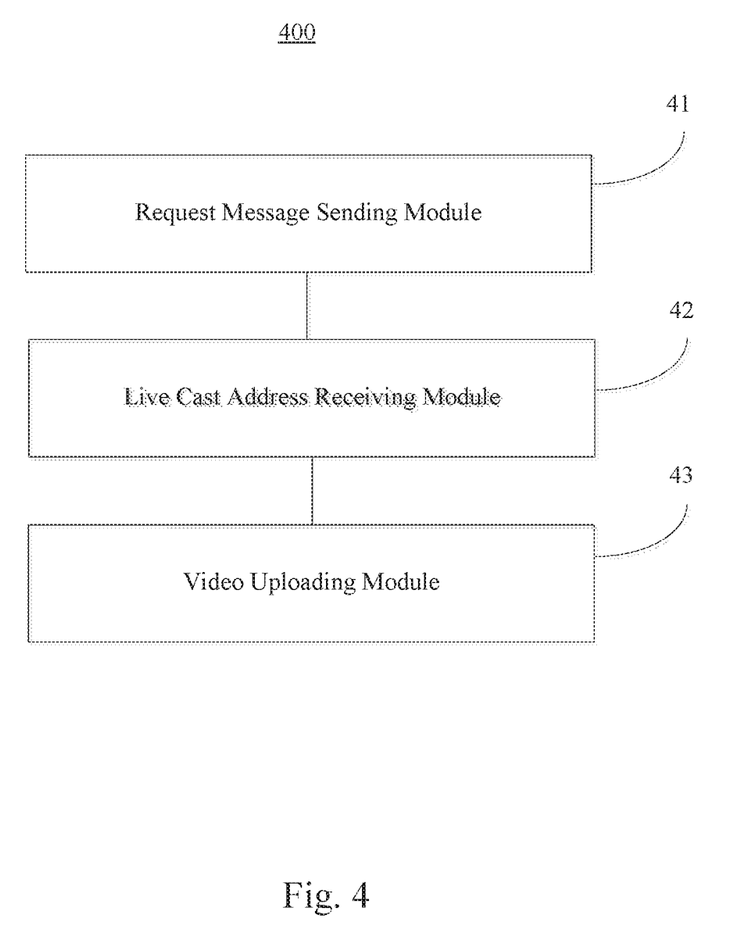
FIG. 4 is a block diagram of a camera apparatus according to an exemplary embodiment.

FIG. 4 is a block diagram of a camera apparatus 400 according to an exemplary embodiment. As shown in FIG. 4, the apparatus 400 includes a request message sending module 41, a live cast address receiving module 42, and a video uploading module 43.

The request message sending module 41 is configured to send a live cast request message to a first server when it is determined that a preset key is triggered, the live cast request message carrying a device identification of a camera apparatus.

The live cast address receiving module 42 is configured to receive a live cast address generated by the first server according to the live cast request message sent by the request message sending module 41, the live cast address corresponding to the device identification.

The video uploading module 43 is configured to upload a video stream recorded by the camera apparatus to a second server, a storage space of the video stream in the second server being determined by the live cast address received by the live cast address receiving module 42.

Figure 5:
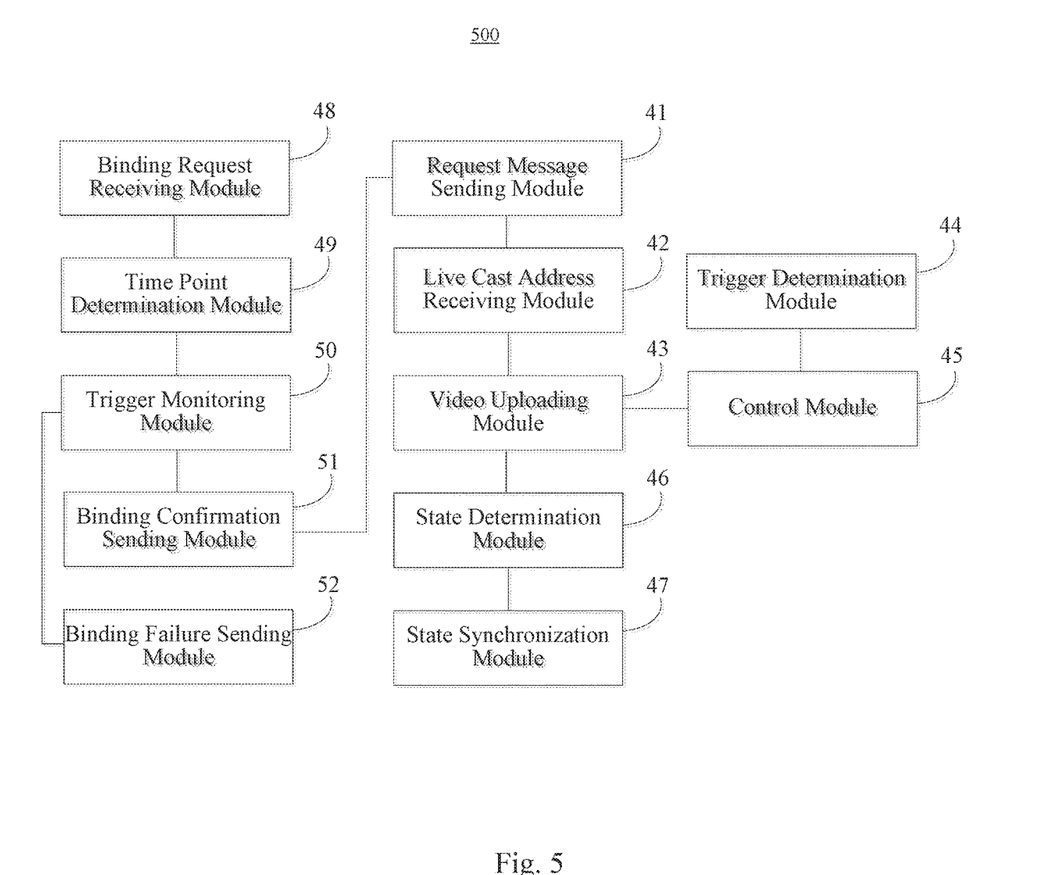
FIG. 5 is a block diagram of a camera apparatus according to an exemplary embodiment.

FIG. 5 is a block diagram of a camera apparatus 500 according to an exemplary embodiment. As shown in FIG. 5, the apparatus 500 further includes the following modules in addition to the request message sending module 41, the live cast address receiving module 42, and the video uploading module 43 (FIG. 4).

A trigger determination module 44 is configured to determine whether the preset key is triggered during the uploading of the video stream.

A control module 45 is configured to control the video uploading module 43 to stop recording the video stream if the trigger determination module 44 determines that the preset key is triggered.

A state determination module 46 is configured to determine a recording state of the video stream currently recorded by the camera apparatus 500.

A state synchronization module 47 is configured to inform an electronic device bound with the camera apparatus of the recording state determined by the state determination module 46 for synchronization.

A binding request receiving module 48 is configured to receive a binding prompt message from the first server before the electronic device is bound with the camera apparatus.

A time point determination module 49 is configured to determine a time point when the binding request receiving module 48 receives the binding prompt message.

A trigger monitoring module 50 is configured to monitor whether the preset key is triggered within a preset time period starting from the time point determined by the time point determination module 49.

A binding confirmation sending module 51 is configured to send a binding confirmation message to the first server when the trigger monitoring module 50 monitors that the preset key is triggered within the preset time period. After it is determined that the electronic device is bound with the camera apparatus, the request message sending module 41 sends the live cast request message to the first server when it is determined that the preset key is triggered.

A binding failure sending module 52 is configured to send a binding failure prompt message to the first server at an ending time point of the preset time period, when the trigger monitoring module 50 monitors that the preset key is not triggered within the preset time period.

Figure 6:
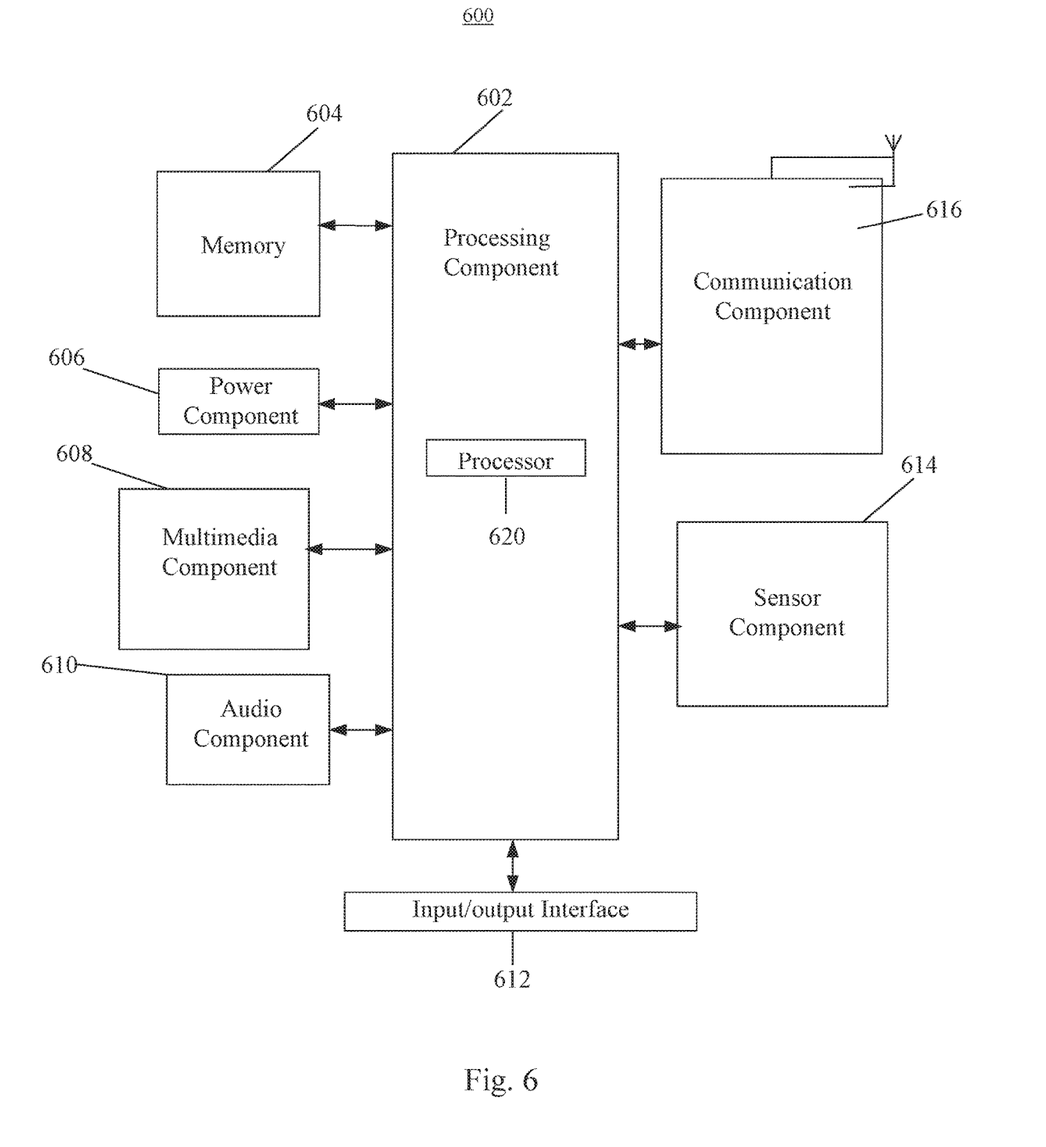
FIG. 6 is a block diagram of a camera apparatus according to an exemplary embodiment.

FIG. 6 is a block diagram of a camera apparatus 600 according to an exemplary embodiment. For example, the apparatus 600 may be an electronic device with a camera, such as a mobile phone, a computer, a digital broadcast terminal, a messaging device, a gaming console, a tablet, a medical device, exercise equipment, a personal digital assistant or the like.

Referring to FIG. 6, the apparatus 600 may include one or more of the following components: a processing component 602, a memory 604, a power component 606, a multimedia component 608, an audio component 610, an input/output (I/O) interface 612, a sensor component 614 and a communication component 616.

The processing component 602 generally controls the overall operations of the apparatus 600, such as operations associated with display, phone call, data communications, camera operations and recording operations. The processing component 602 may include one or more processors 620 to execute instructions to perform all or part of the steps in the above described methods. In addition, the processing component 602 may include one or more modules to facilitate the interaction between the processing component 602 and other components. For example, the processing component 602 may include a multimedia module to facilitate the interaction between the multimedia component 608 and the processing component 602.

The memory 604 is configured to store various types of data to support the operations of the apparatus 600. Examples of such data include instructions for any applications or methods operated on the apparatus 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power supply management system, one or more power sources, and any other components associated with the generation, management, and distribution of power in the apparatus 600.

The multimedia component 608 includes a screen providing an output interface between the apparatus 600 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive external multimedia data while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the apparatus 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the apparatus 600. For instance, the sensor component 614 may detect an open/closed status of the apparatus 600, relative positioning of components, e.g., the display and the keypad, of the apparatus 600, a change in position of the apparatus 600 or a component of the apparatus 600, presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor or a temperature sensor.

The communication component 616 is configured to facilitate wired or wireless communication between the apparatus 600 and other devices. The apparatus 600 can access a wireless network based on a communication standard, such as WiFi, 2G, 3G, or 4G, or a combination thereof. In one exemplary embodiment, the communication component 616 receives a broadcast signal or broadcast related information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary embodiment, there is also provided a non-transitory computer-readable storage medium including instructions, such as included in the memory 604, executable by the processor 620 of the camera apparatus 600, for performing the above-described methods. For example, the non-transitory computer-readable storage medium may be a ROM, a RAM, a CD-ROM, a magnetic tape, a floppy disc, an optical data storage device, and the like. The processor 620, when executing the instructions, is configured to: send a live cast request message to a first server when it is determined that a preset key is triggered, the live cast request message carrying a device identification of the camera apparatus 600; receive a live cast address generated by the first server according to the live cast request message, the live cast address corresponding to the device identification; and upload a video stream recorded by the camera apparatus 600 to a second server, a storage space of the video stream in the second server being determined by the live cast address.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A video uploading method performed by a camera apparatus, comprising:
sending a live cast request message to a first server when it is determined that a preset key on the camera apparatus is triggered, the live cast request message carrying a device identification of the camera apparatus;
receiving a live cast address generated by the first server according to the live cast request message, the live cast address corresponding to the device identification;
uploading a video stream recorded by the camera apparatus to a second server, a storage space of the video stream in the second server being determined by the live cast address;
determining a recording state of the video stream currently recorded by the camera apparatus; and
informing an electronic device bound with the camera apparatus of the recording state for synchronization,
wherein before the electronic device is bound with the camera apparatus, the method performed by the camera apparatus further comprises:
receiving from the first server a binding prompt message for binding the electronic device with the camera apparatus, and determining a time point when the binding prompt message is received;
determining that the preset key is triggered within a preset time period starting from the time point; and
sending a binding confirmation message to the first server based on the preset key being triggered within the preset time period.

2. The method of claim 1, further comprising:
determining whether the preset key is triggered during the uploading of the video stream; and
stopping the uploading of the video stream to the second server if the preset key is triggered.

3. A camera apparatus, comprising:
a processor; and
a memory for storing instructions executable by the processor, wherein the processor is configured to:
send a live cast request message to a first server when it is determined that a preset key on the camera apparatus is triggered, the live cast request message carrying a device identification of the camera apparatus;
receive a live cast address generated by the first server according to the live cast request message, the live cast address corresponding to the device identification;
upload a video stream recorded by the camera apparatus to a second server, a storage space of the video stream in the second server being determined by the live cast address;
determine a recording state of the video stream currently recorded by the camera apparatus; and
inform an electronic device bound with the camera apparatus of the recording state for synchronization,
wherein before the electronic device is bound with the camera apparatus, the processor is further configured to:
receive from the first server a binding prompt message for binding the electronic device with the camera apparatus, and determine a time point when the binding prompt message is received;
determine that the preset key is triggered within a preset time period starting from the time point; and
send a binding confirmation message to the first server based on the preset key being triggered within the preset time period.

4. The camera apparatus of claim 3, wherein the processor is further configured to:
determine whether the preset key is triggered during the uploading of the video stream; and
stop the uploading of the video stream to the second server if the preset key is triggered.

5. A non-transitory computer-readable storage medium having stored therein instructions that, when executed by a processor of a camera apparatus, cause the camera apparatus to perform a video uploading method, the method performed by the camera apparatus comprising:

sending a live cast request message to a first server when it is determined that a preset key on the camera apparatus is triggered, the live cast request message carrying a device identification of the camera apparatus;

receiving a live cast address generated by the first server according to the live cast request message, the live cast address corresponding to the device identification;

uploading a video stream recorded by the camera apparatus to a second server, a storage space of the video stream in the second server being determined by the live cast address;

determining a recording state of the video stream currently recorded by the camera apparatus; and informing an electronic device bound with the camera apparatus of the recording state for synchronization, wherein before the electronic device is bound with the camera apparatus, the method performed by the camera apparatus further comprises:

receiving from the first server a binding prompt message for binding the electronic device with the camera apparatus, and determining a time point when the binding prompt message is received;

determining that the preset key is triggered within a preset time period starting from the time point; and sending a binding confirmation message to the first server based on the preset key being triggered within the preset time period.

6. The non-transitory computer-readable storage medium of claim 5, wherein the method further comprises:

determining whether the preset key is triggered during the uploading of the video stream; and stopping the uploading of the video stream to the second server if the preset key is triggered.

* * * * *